R. F. ARNOTT.
RECORDING AND INTEGRATING INSTRUMENT.
APPLICATION FILED JUNE 2, 1915.

1,204,729.

Patented Nov. 14, 1916.
3 SHEETS—SHEET 1.

Inventor
R. F. Arnott,
By his Attorney
T. F. Bourne

R. F. ARNOTT.
RECORDING AND INTEGRATING INSTRUMENT.
APPLICATION FILED JUNE 2, 1915.
1,204,729.
Patented Nov. 14, 1916.
3 SHEETS—SHEET 2.
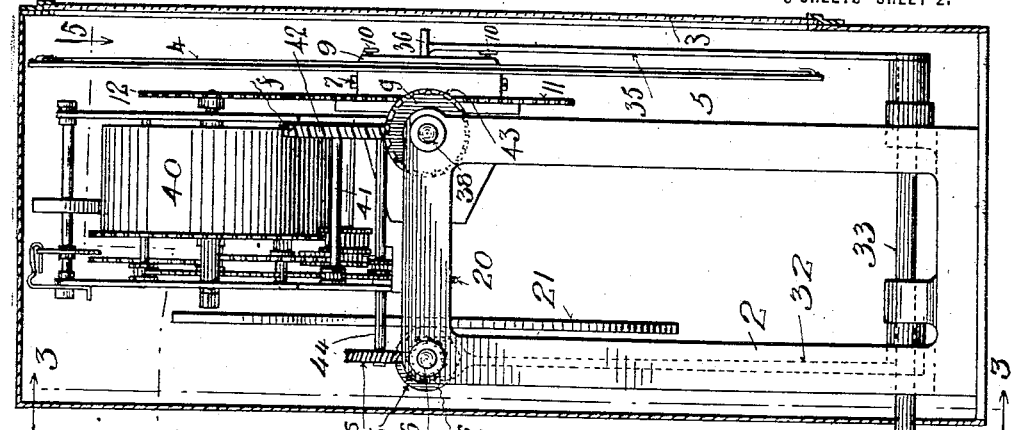
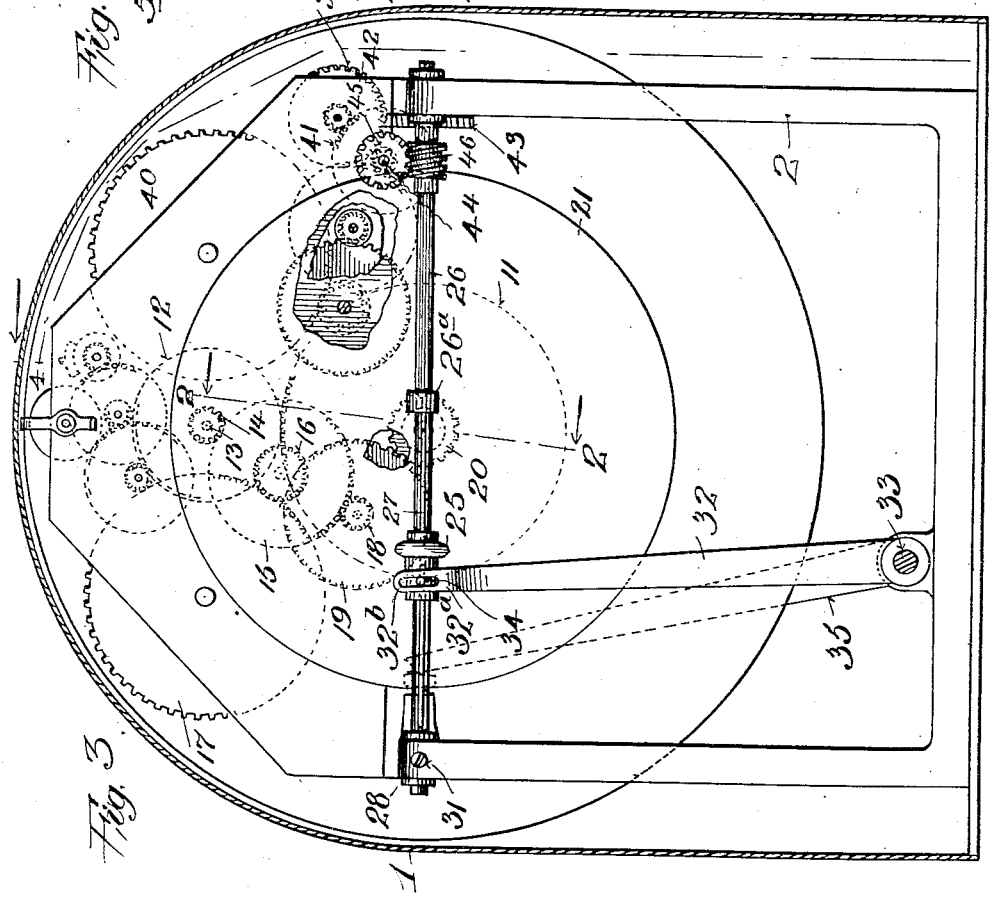
Inventor
R. F. Arnott
By his Attorney
P. F. Bourne R. F. ARNOTT.
RECORDING AND INTEGRATING INSTRUMENT.
APPLICATION FILED JUNE 2, 1915.
1,204,729.
Patented Nov. 14, 1916.
3 SHEETS—SHEET 3.
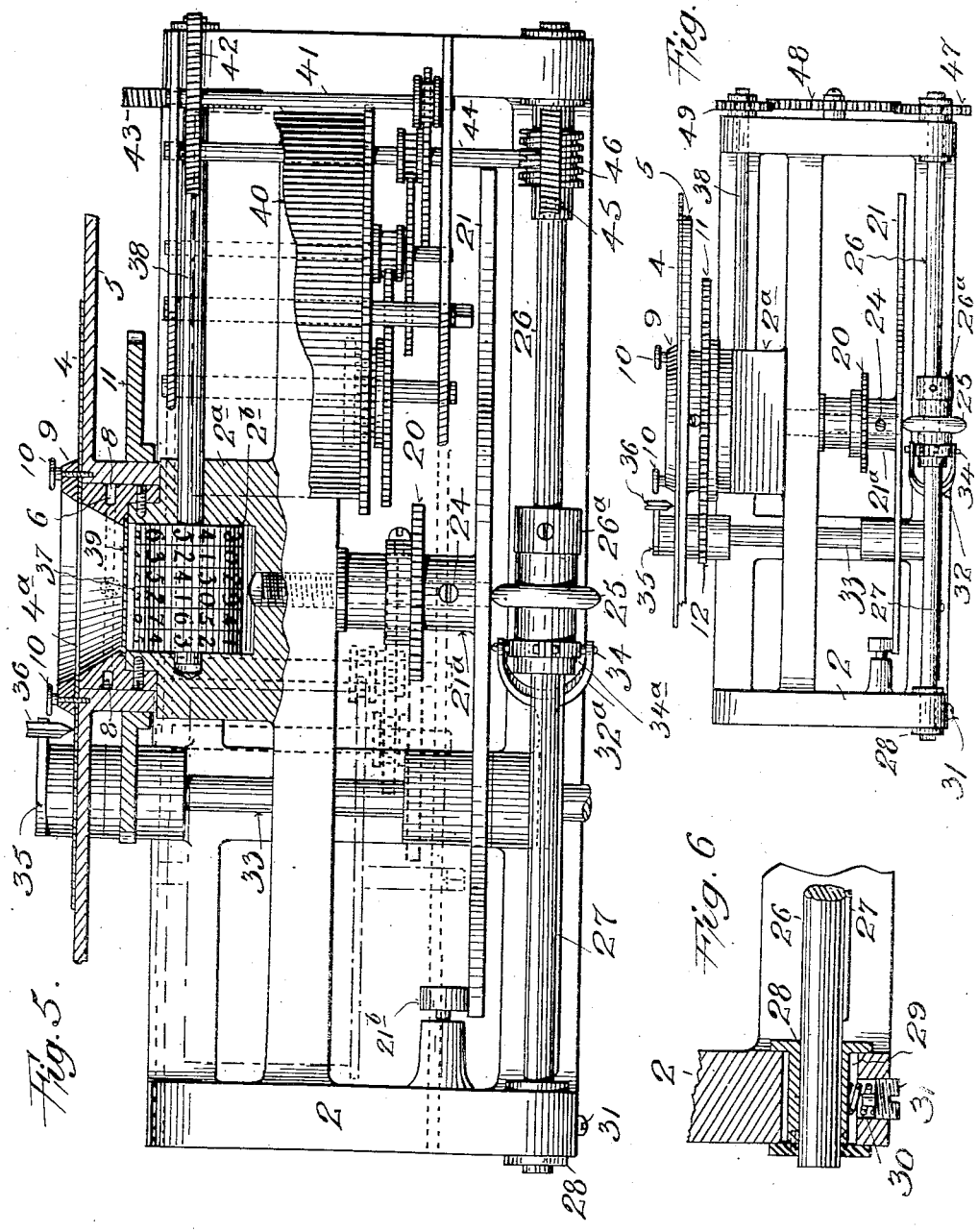
Inventor-
R. F. Arnott.
By his Attorney
P. F. Bourne

UNITED STATES PATENT OFFICE.

ROBERT F. ARNOTT, OF MONTCLAIR, NEW JERSEY, ASSIGNOR TO GAMALIEL C. ST. JOHN, OF GREENWICH, CONNECTICUT.

RECORDING AND INTEGRATING INSTRUMENT.

1,204,729.  Specification of Letters Patent.  Patented Nov. 14, 1916.

Application filed June 2, 1915. Serial No. 31,660.

*To all whom it may concern:*

Be it known that I, ROBERT F. ARNOTT, a subject of the King of England, and resident of Montclair, in the county of Essex and State of New Jersey, have invented certain new and useful Improvements in Recording and Integrating Instruments, of which the following is a specification.

The object of my invention is to provide simple and efficient means for recording and integrating the flow of liquids, gases, electric current and the like, as well as for recording and integrating pressures, temperature, and barometric variations, and for analogous uses.

In carrying out my invention I provide a chart or dial, means for indicating thereon variations of flow, pressure or the like, and means to advance the chart, with counting or integrating devices adapted to indicate the accumulation of flow, pressure or the like, and with means normally tending to actuate such counter, but held in check and permitted to operate only in accordance with the flow, pressure or the like that is being measured at a given time, such as in accordance with the record or indication being produced upon the chart or dial.

My invention further comprises novel details of improvement and combinations of parts that will be more fully hereinafter set forth and then pointed out in the claims.

Figure 1:
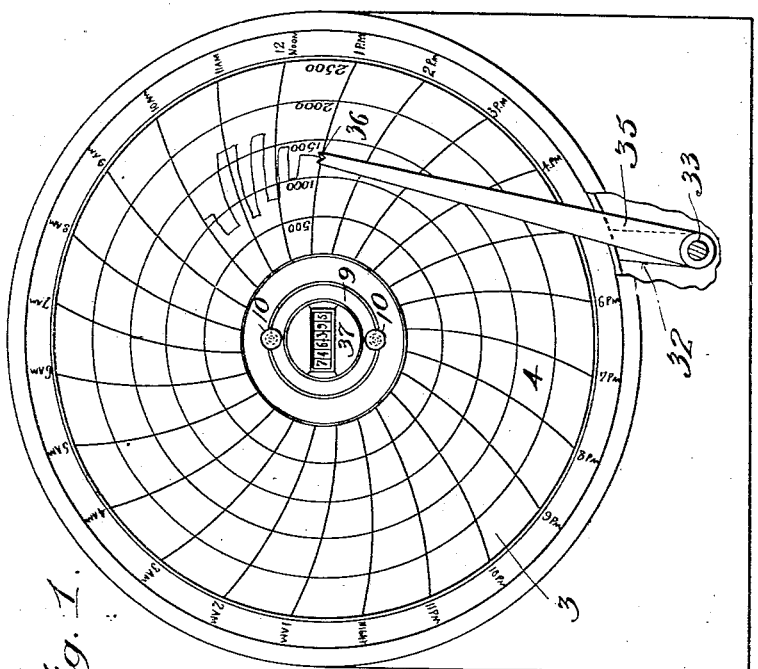
Figure 2:
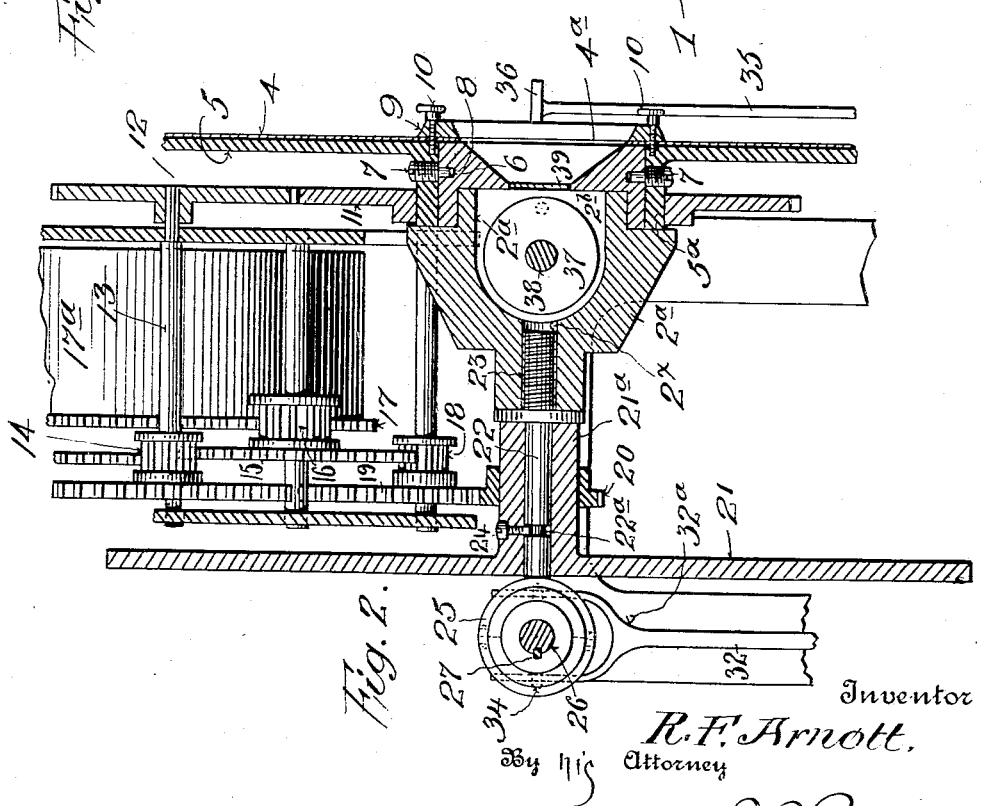

Reference is to be had to the accompanying drawings forming part hereof, wherein, Figure 1 is a face view of an integrating instrument embodying my invention; Fig. 2 is a detail section, enlarged, on the line 2, 2, in Fig. 3; Fig. 3 is a partly broken view taken substantially on the line 3, 3, in Fig. 4; Fig. 4 is a section on the line 4, 4, in Fig. 3; Fig. 5 is an enlarged plan view, partly in section, on the line 5, 5, in Fig. 4; Fig. 6 is an enlarged detail; and Fig. 7 is a plan view illustrating a modification.

Similar numerals of reference indicate corresponding parts in the several views.

The numeral 1 indicates a suitable casing, within which is secured a suitable frame 2 adapted to support mechanism hereinafter described. Casing 1 is preferably made tight to exclude dust and moisture and may be provided with a transparent protector at 3.

At 4 is a suitable chart or dial, shown adapted to be removably attached to a disk or plate 5 that is mounted to rotate upon a support 6 secured to a part or bearing portion $2^a$ of frame 2. I have shown hub $5^a$ of disk 5 as journaled upon support 6 and provided with studs 7 entering an annular groove 8 in support 6, whereby said disk or plate is rotatively retained upon said support (Figs. 2 and 5). The chart or dial 4 is shown secured upon disk 5 by means of a ring 9 through which screws 10 pass into disk 5, the chart or dial having a central opening at $4^a$ in register with the opening in ring 9 for a purpose hereinafter stated. To rotate the chart 4 and disk 5 I have shown a gear 11 secured upon the hub of said disk and in mesh with a gear 12 of a motor or clock train carried by frame 2. The shaft 13 carrying gear 12 is shown provided with a pinion 14 in mesh with a gear 15, whose shaft carries pinion 16 in mesh with a driving gear 17, adapted to be rotated by spring $17^a$ in any wellknown manner. Gear 15 is shown in mesh with a pinion 18 whose shaft carries a gear 19 in mesh with a pinion 20 secured on the hub $21^a$ of a disk 21. By the arrangement described, the chart 4 and disk 21 are rotated in desired synchronism and ratio. The chart as illustrated is intended to rotate once in twenty-four hours. Any other suitable motive power or train of gearing may be provided for the purpose described. The disk 21 is mounted to rotate freely upon a non-rotative stud or shaft 22, shown provided with threads 23 meshing in a threaded bore $2^x$, in support $2^a$, whereby said stud is secured to said support, and said stud or shaft is shown provided with an annular groove $22^a$ (Fig. 2) receiving a screw 24 carried by hub $21^a$, whereby disk 21 is maintained in proper rotative position upon stud or shaft 22. The outer end of stud or shaft 22 is shown exposed through the bore or hub $21^a$ and substantially flush with the surface of disk 21 to enable a friction wheel 25 to rest on said stud or shaft, out of contact with disk 21, when the instrument is not registering or integrating. The outer end of stud or shaft 22 is preferably flush with the surface of disk 21 so that wheel 25 may readily slide from one to the other thereof. Friction wheel 25 is slidably mounted upon a shaft 26 that is journaled in bearings in frame 2, said wheel being shown splined to said shaft, as by key 27, (Fig. 2), whereby the wheel may rotate the shaft in different positions of adjustment of the wheel along the shaft. Shaft 26 is maintained in position to cause wheel 25 to bear upon disk 21, in all positions of adjustment of said wheel except its central one, and in order to maintain wheel 25 resiliently pressed against disk 21 one or both bearings of shaft 26 may be mounted to move in corresponding openings 29 in frame 2, spring 30 pressing against said bearing 28 and against a stop 31 normally tending to move shaft 26 toward disk 21 (Fig. 6).

Friction wheel 25 is to be moved back and forth along shaft 26 in accordance with the volume, flow or pressure of the element to be registered, recorded or integrated, such as the pressure or flow of steam or other gases or of electric current, or variations of temperature or barometer, or other object to be recorded. For this purpose I have shown an arm 32 secured upon a rock shaft 33 journaled in bearings in frame 2, the free end of arm 32 being movably connected with wheel, 25, as by means of the forked end 32ª of said arm, having slots 32ᵇ receiving pins 34 projecting from opposite sides of the ring 34ª on the hub of wheel 25. Shaft 33 may be rocked by suitable connection with the actuating valve or other part of a steam or other meter or device whose action or function is to be recorded and integrated.

At 35 is an arm connected with arm 32 and shown attached to shaft 33, said arm being adapted to move in front of chart or dial 4. Said arm is provided with a suitable or well known pen, pencil or the like 36 in engagement with said chart or dial, to mark thereon a line during the rotation of the chart or dial to graphically indicate thereon pressure, flow or the like, and for such purpose the chart will bear suitable lines and other designations to indicate, for instance, periods of time of flow or pressure, extent of movement, and the like with respect to the gas or other thing to be recorded. It will be understood that when no record is being made wheel 25 will be maintained in substantial register with the axis of disk 21, and that according to the movement of arm 35 outwardly from such axis, a line will be drawn upon the chart or dial during rotation of the latter. When the friction wheel 25 is resting upon the stud or shaft 22, and disk 21 continues to rotate, said wheel will be maintained out of contact with said disk so as not to wear away the surface of the wheel, and that as soon as said wheel is moved into contact with disk 21, said wheel will be caused to rotate at a speed proportionate to the distance of wheel 25 along disk 21 from the axis of said disk. A stop 26ª on shaft 26 is so located that when engaged by wheel 25 the latter will bear on stud 22 when the instrument is not recording. A roller 21ᵇ mounted on the frame 2 supports the disk 21 against the pressure of the wheel 25.

In the example of my invention illustrated in the accompanying drawings, wheel 25 is utilized to permit integration or adding of units of pressure, flow or the like recorded upon the chart or dial 4. To this end I have shown an integrator or counter at 37, which may be of any wellknown construction, such as comprising a series of numbering disks to be rotated by a shaft 38 supported in suitable bearings in frame 2. I have shown integrator or adder 37 as located in a recess 2ᵇ in part 2ª of frame 2 in register with the axis of chart or dial 4 and behind the same in position to be observed through the central opening 4ª of said chart or dial, and through the openings in ring 9 and support 6. A transparent protector at 39 may be provided in front of integrator or adder 37. To rotate shaft 38 I have shown a motor in the form of a suitable clock train at 40, adapted to rotate a shaft 41 shown having a spiral gear 42 in mesh with a spiral gear 43 secured on shaft 38. The shaft 44 of clock train 40 is provided with a worm wheel 45 in mesh with a worm 46 secured on shaft 26, said worm gearing being so arranged as to be irreversible. By this means the clock train 40 is held in check and only allowed to rotate shaft 38 in accordance with the rotation of shaft 26 derived from the rotation of wheel 25 in contact with disk 21.

When the instrument is not recording, the friction wheel 25 will rest at the axis of disk 21, on the end of shaft or stud 22, and pen or pencil 36 will be at the zero part of the chart, and then, as friction wheel 25 does not rotate, because it rests against the stationary shaft or stud 22, although disk 21 and the dial may then be rotating, a zero line will be drawn upon the chart, and integrator or adder 37 will not operate because worms 45 and 46 then hold motor 40 in check. As soon as arm 35 is moved radially along chart 4, (as to the right in Fig. 1), by reason of the flow of fluid or electric current through a meter, or by any other device, whose functions or operations are to be recorded and integrated, the pen or pencil will draw a line on the moving chart or dial, at such distance from the center thereof as accords with the action of the meter or other device controlling said arm. Such line will indicate on the chart or dial units of flow, pressure or the like during periods of time indicated by the time designations or lines on the chart or dial, producing a curve line thereon in a wellknown manner. Since the speed of rotation of wheel 25 in contact with disk 21 will be in proportion to the distance of said wheel radially from the axis of said disk at any given time, (which corresponds with the movement of the pencil across the chart or dial), the worm 46 will permit the worm wheel 45 to be rotated by the clock train 40 to permit the latter through gearing 42, 43 to rotate shaft 38 to cause the numbering wheels of the integrator 37 to be rotated to indicate the accumulation of units of flow, pressure or the like occurring while wheel 25 is operated by disk 21. The number shown on the integrator at any given time will indicate the full number of units of flow, pressure or the like on the meter from zero, while the chart may be arranged for recording daily or weekly the state of the meter at periods of time indicated on the chart. Hence, the chart may be checked against the integrator at any time, and the integrator may be utilized to indicate the consumption of gas or the like or the operation of the meter between given periods.

By means of my improvements the integrator may be driven directly by the clock or train motor 40, as permitted to operate by the action of disk 21 and wheel 25, as distinguished from causing the wheel 25 to serve as the driving member for an indicator or adder. The integrator, therefore, need not be made to operate delicately, since the motor 40 may have sufficient power to operate any desired integrator. By means of the gearing 45, 46 interposed between shaft 26 and the shaft 38 of the integrator or counter, the operation of the integrator is somewhat in the nature of an escapement controlled by the action of wheel 25.

In the modification shown in Fig. 7 the chart or dial 4 and the friction disk 21 and wheel 25 may be operated in the manner first described with respect to the first named clock or motor train, the clock or motor train 40 may be dispensed with, friction wheel 25, however, resting at the zero position out of contact with disk 21 as against the end of said stud or shaft 22, as before described, and the integrator or counter may be operated directly by shaft 26 or by means of any suitable gearing. In the example illustrated in Fig. 7 I have shown shaft 26 provided with a gear 47 in mesh with a gear 48 which meshes with a gear 49 secured on shaft 38, whereby said shaft may be rotated in a desired direction and at the desired speed according to the speed of rotation of wheel 25. In Fig. 7 it will be understood that the integrator or counter is located opposite the opening 4ᵃ of chart 4 in the manner illustrated in Figs. 1 and 5. Also, that the frame 2 and the mechanism carried thereby may be inclosed within casing 1 as before described. In cases where it is not required that the instrument record pressure, flow or other function of a device, the support 5 and means for retaining the chart thereon may be dispensed with, in which event the instrument would operate only as an integrator, and in that case the integrator mechanism 37 may be located in any suitable position upon the instrument.

While I have illustrated and described a particular embodiment of my invention it will be understood that the same may be varied, within the scope of the appended claims, without departing from the spirit of the invention.

Having now described my invention what I claim is:—

1. An instrument of the kind described comprising an integrator, a motor to operate the integrator, a second motor, and means interposed between said motors for controlling the operation of the first named motor by the second named motor.

2. An instrument of the kind described comprising a disk, means to support the disk, means to operate the disk, an integrator, means to operate the integrator, and means interposed between the disk and the integrator operating means for controlling the operation of the latter by and in accordance with the operation of the disk.

3. An instrument of the kind described comprising a disk, means to support the disk, means to operate the disk, an integrator, means to operate the integrator, and gearing interposed between the disk and the integrator-operating means for controlling the operation of the latter by and in accordance with the operation of the disk.

4. An instrument of the kind described comprising an integrator, a motor to operate the integrator, a second motor, and means interposed between said motors to variably control the first named motor.

5. An instrument of the kind described comprising an integrator, a motor to operate the integrator, a second motor, a disk, means to operate the disk by the second motor, a friction wheel to coact with the disk, a shaft slidably supporting the friction wheel for variable rotation of the disk and wheel, gearing interposed between said shaft and the first-named motor, and means separate from either motor to adjust the friction wheel against said disk.

6. An instrument of the kind described comprising means to support a chart, means to operate the chart, means to record on the chart, an integrator, means to operate the integrator, and means interposed between the chart operating means and the integrator operating means for controlling the operation of the latter by and in accordance with the operation of the former.

7. An instrument of the kind described comprising means to support a chart, means to operate the chart, means to record on the chart, an integrator, means to operate the integrator, and gearing interposed between the chart operating means and the integrator operating means to permit operation of the integrator operating means only in accordance with the operation of part of said gearing by the chart operating means.

8. An instrument of the kind described comprising means to support a chart, means to operate the chart, means to record on the chart, an integrator, means to operate the integrator, a worm wheel connected with the integrator operating means, a worm in mesh with said worm wheel, and means operative by the chart operating means for actuating said worm according to the indications produced on the chart.

9. An instrument of the kind described comprising means to support a chart, means to operate the chart, means to record on the chart, an integrator, means to operate the integrator, gearing interposed between the chart operating means and the integrator operating means, and means to variably control said gearing according to the recording on the chart.

10. An instrument of the kind described comprising means to support a chart, means to operate the chart, means to record on the chart, an integrator, means to operate the integrator, gearing to control the integrator operating means, and means operative by and with the chart operating means to control said gearing to vary the operation of the integrator operating means according to the recording on the chart.

11. An instrument of the kind described comprising means to support a chart, means to operate the chart, means to record on the chart, an integrator, means to operate the integrator, gearing to coact with the integrator operating means, a shaft carrying part of said gearing, a disk operative with the chart operating means, a friction wheel coactive with said disk and with said shaft to operate the latter by the former, and means to adjust said wheel with relation to said disk.

12. An instrument of the kind described comprising means to support a chart, means to operate the chart, means to record on the chart, an integrator, means to operate the integrator, a worm wheel connected with the integrator operating means, a worm in mesh with said worm wheel, a shaft to operate said worm, a wheel slidable upon said shaft, means to cause the shaft to rotate with the wheel, means to adjust the wheel along the shaft, a disk to coact with said wheel, and means to rotate said disk by the chart operating means.

13. An instrument of the kind described comprising a frame, a support having an axial opening, means to rotatively retain said support upon the frame, means to retain an apertured chart upon said support with its opening in register with the opening of said support, means to record upon the chart, an integrator, said frame having means supporting the integrator opposed to the openings of the chart and said support, a motor to rotate said support, a motor to operate said integrator, and means interposed between said motors and operative by the first named motor to control the operation of the integrator-operating motor in accordance with the record produced on the chart.

14. An instrument of the kind described comprising a frame, a support having an axial opening, means to rotatively retain said support upon the frame, means to retain an apertured chart upon said support with its opening in register with the opening of said support, means to record upon the chart, an integrator, said frame having means supporting the integrator opposed to the openings of the chart and said support, a motor to rotate said support, a disk operative with said motor, a wheel to coact with said disk, means to adjust the wheel with relation to the disk, a motor to operate the integrator, and gearing between the last named motor and said wheel to control the operation of said motor in accordance with the position of the wheel with respect to the disk.

15. An instrument of the kind described comprising a frame, a support having an axial opening, means to rotatively retain said support upon the frame, means to retain an apertured chart upon said support with its opening in register with the opening of said support, means to record upon the chart, an integrator, said frame having means supporting the integrator opposed to the openings of the chart and said support, a motor to rotate said support, a disk operative with said motor, a wheel to coact with said disk, means to adjust the wheel with relation to the disk, a shaft slidably supporting said wheel, a worm connected with the shaft, a worm wheel coactive with said worm, and a motor to actuate said integrator, said worm wheel being connected with said motor whereby the operation of the latter is controlled in accordance with the position of the wheel with respect to the disk.

Signed at New York city, in the county of New York, and State of New York, this 28th day of May, A. D. 1915.

ROBERT F. ARNOTT.

Witnesses:
T. F. BOURNE,
MARIE F. WAINWRIGHT.